United States Patent [19]
Fujita et al.

[11] Patent Number: 5,325,206
[45] Date of Patent: Jun. 28, 1994

[54] CAMERA CONTROLLING APPARATUS

[75] Inventors: Masahiro Fujita, Saitama; Keiko Abe, Kanagawa, both of Japan

[73] Assignee: Sony Corporation, Japan

[21] Appl. No.: 942,831

[22] Filed: Sep. 10, 1992

[30] Foreign Application Priority Data

Sep. 17, 1991 [JP] Japan ................... 3-265277

[51] Int. Cl.⁵ ............................................. H04N 5/232
[52] U.S. Cl. ................................... 348/347; 348/352; 348/358
[58] Field of Search ............... 358/105, 125, 225, 227; H04N 5/235, 5/232

[56] References Cited

U.S. PATENT DOCUMENTS 5,196,929 3/1993 Miyasaka ........................ 358/125

FOREIGN PATENT DOCUMENTS 4198887 7/1992 Japan.
5041827 2/1993 Japan.

Primary Examiner—Howard W. Britton
Attorney, Agent, or Firm—Ronald P. Kananen

[57] ABSTRACT

A video camera having a zoom controlling apparatus which readily controls the magnitude of an image to a fixed size. The camera apparatus detects movement of a subject being photographed based on changes in the image signal and detects the magnitude of the subject being photographed by the imaging device. A servo-control maintains the magnitude of a subject being viewed by the camera constant by moving a zoom lens in response to the detected magnitude.

10 Claims, 5 Drawing Sheets

F I G. 2
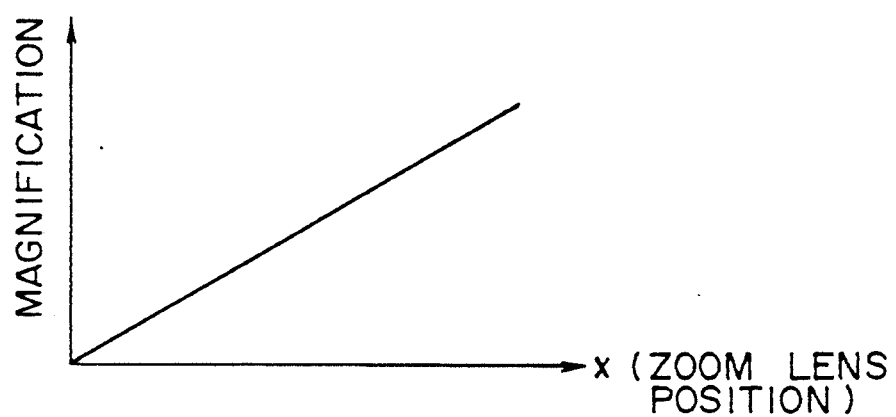

CAMERA CONTROLLING APPARATUS

BACKGROUND OF THE INVENTION

1. Field of the Invention

This invention relates to a camera controlling apparatus suitable for use with, for example, a video camera which may or may not be integrated with a video tape recorder.

2. Description of the Related Art

Video cameras are popular and wisely used a common user, for example, takes a photograph of a scene of an athletic meeting of a child of the user. A video camera normally includes a viewfinder so that a subject for photographing can be photographed with a desired angle of field or size while observing an image of the subject indicated in the viewfinder.

A conventional video camera is in most cases used to photograph, when, for example, a child as a subject runs a 100-meter race, the child running from a start position to a goal position using a zooming function. In this instance, focusing is automatically controlled with most video cameras, and with a video camera of the type just mentioned, the field of angle decreases (the size of the image increases) as the child runs from the start position to the goal position. With a conventional camera, however, it is comparatively difficult for an unskilled user to successively photograph the expression of a child running from the start position to the goal position with a predetermined fixed size, for example, by bust shot.

SUMMARY OF THE INVENTION

It is an object of the present invention to provide a camera controlling apparatus which can control the size of an image readily to a fixed size.

In order to attain the object, according to the present invention, there is provided a camera controlling apparatus which comprises photographing means for photographing a subject, movement detecting means for detecting a movement of the subject photographed by the photographing means, magnitude detecting means for detecting a magnitude of the subject photographed by the photographing means, and controlling means for controlling the magnitude of the subject photographed by the photographing means in response to an output of the magnitude detecting means.

In the camera controlling apparatus, a video signal of a subject photographed by the photographing means is supplied to the movement detecting means, which thus detects a movement of the subject photographed by the photographing means from the received video signal. The magnitude detecting means detects a magnitude of the subject photographed by the photographing means in response to an output of the movement detecting means. The controlling means controls the magnitude of the subject photographed by the photographing means in response to an output of the magnitude detecting means so that the magnitude of the subject may be maintained fixed. Consequently, the magnitude of the image of the subject can be maintained fixed without special manual operation of the photographing means.

The camera controlling apparatus may further comprise storage means for storing an image signal for a frame outputted from the photographing means, the movement detecting means receiving an image signal for a current frame outputted from the photographing means and another image signal for a last frame recalled from the storage means to detect a movement of the subject photographed by the photographing means. Alternatively, the camera controlling apparatus may further comprise first storage means for storing an image signal for a frame outputted from the photographing means, and second storage means for receiving and storing therein an image signal recalled from the first storage means, the movement detecting means receiving an image signal for a frame recalled from the first storage means and another image signal for a last frame recalled from the storage means to detect a movement of the subject photographed by the photographing means.

The camera controlling apparatus may further comprise target designating means for designating a subject the magnitude of which is to be controlled by the controlling means when the subject is photographed by the photographing means. A subject the magnitude of which is desired to be maintained fixed can be arbitrarily designated by the controlling means.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a diagram showing a relationship between the position of a zoom lens and the photographing magnification of a television camera in which the camera controlling apparatus shown in FIG. 1 is incorporated:

DETAILED DESCRIPTION OF THE PREFERRED EMBODIMENT

Figure 1:
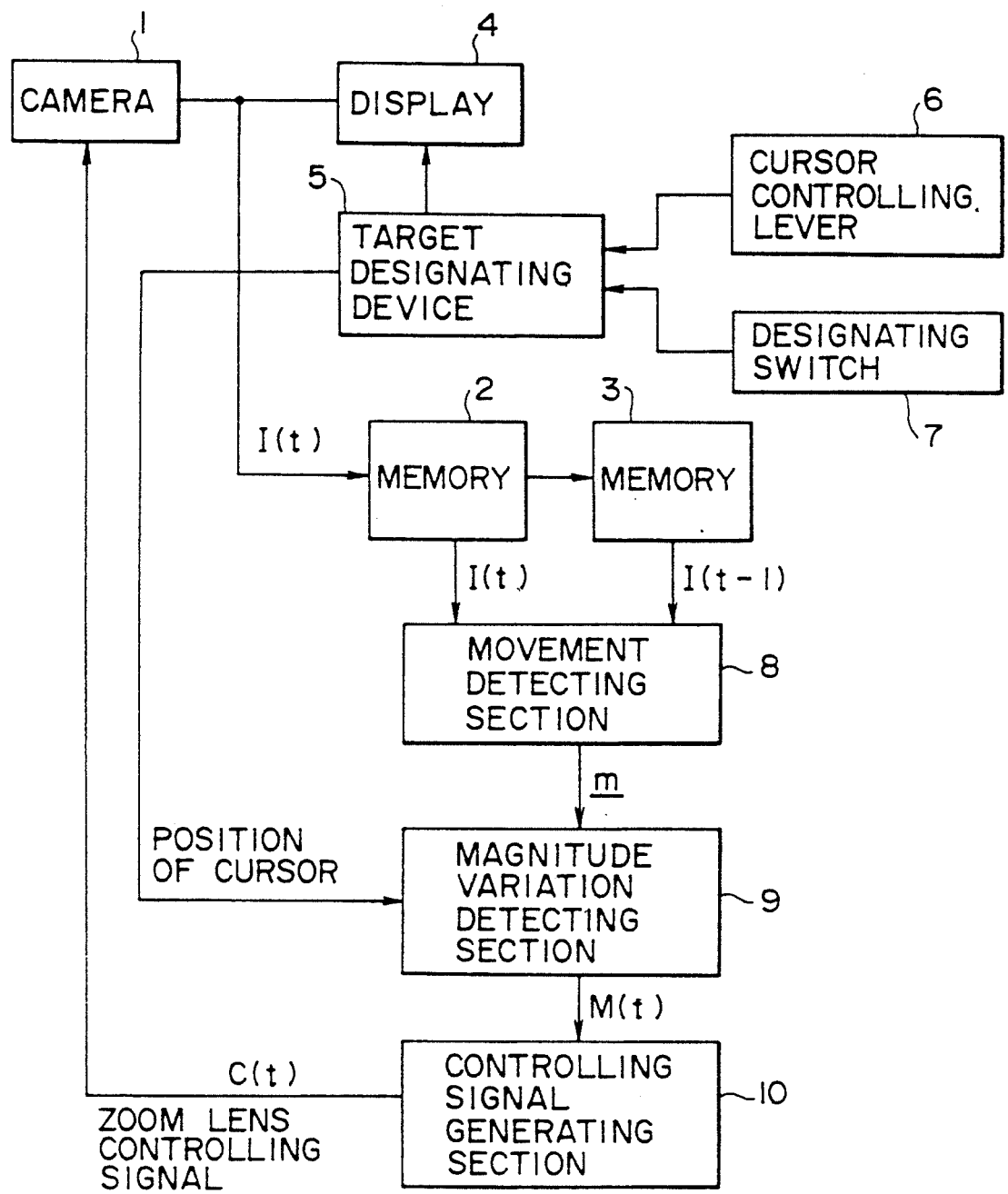
FIG. 1 is a block diagram of a camera controlling apparatus showing a preferred embodiment of the present invention.

Referring first to FIG. 1, there is shown a schematic construction of a camera controlling apparatus to which the present invention is applied. A video camera 1 photographs a subject for photographing not shown and supplies an image signal of the thus photographed subject to a display unit 4 so that an image of the image signal is displayed on the display unit 4. The display unit 4 may be a viewfinder incorporated in the video camera 1 or may be a cathode ray tube provided separately from and connected to the video camera 1. The video signal outputted from the video camera 1 is supplied also to a memory 2 and further to another memory 3 so that it is stored into them. In this instance, a later image signal and a previous image signal in time are stored in the memories 2 and 3, respectively. For example, an image signal previous by one frame distance to another image signal stored in the memory 2 is stored in the other memory 3.

A target designating device 5 causes the display unit 4 to display a predetermined cursor thereon. A cursor controlling lever 6 is manually operated when the position of the cursor displayed on the display unit 4 is to be moved to a predetermined position. A designating switch 7 is manually operated when the position of the cursor is to be settled.

A movement detecting section 8 detects a movement of the subject from data stored in the memories 2 and 3 and outputs a detection signal (movement vector) to a magnitude variation detecting section 9. Also a signal corresponding to the displayed position of the cursor is supplied from the target designating device 5 to the magnitude variation detecting section 9. The magnitude variation detecting section 9 detects a variation in magnitude of a subject from the input signals thereto and supplies a detection signal to a controlling signal generating section 10. The controlling signal generating section 10 generates, in response to the output of the magnitude variation detecting section 9, a zoom lens controlling signal for controlling a built-in zoom lens of the video camera 1.

In operation, a user will photograph a desired subject by means of the video camera 1. A video signal of the subject is supplied to the display unit 4, on which it is displayed. Meanwhile, a video signal of a frame and another video signal of another frame previous by one frame distance of the subject which vary every moment are updated successively in the memories 2 and 3. The movement detecting section 8 detects a movement of the subject from brightness data I(t) of the video signal stored in the memory 2 and another brightness data I(t-1) of the video signal of the frame previous by one frame distance and stored in the memory 3. A principle of the detection of a movement will be hereinafter described.

The cursor is superimposed on the display unit 4. The user will thus manually operate the cursor controlling lever 6 to move the cursor on the display screen of the display unit 4 to the position of a subject the size of which the user wants to keep fixed. After the cursor has been moved to the position of the desired subject, the user will further operate the designating switch 7 manually. The target designating device 5 thus outputs information of the position of the cursor designated then to the magnitude variation detecting section 9. The magnitude variation detecting section 9 detects the magnitude of the subject then from the position information of the cursor and a movement vector m of the subject detected by the movement detecting section 8 and then detects a variation of the magnitude. Also a principle of detection of the variation in magnitude will be hereinafter described. The controlling signal generating section 10 generates a zoom lens controlling signal in accordance with the magnitude variation detection signal detected by the magnitude variation detecting section 9.

The magnification of the zoom lens of the video camera 1 is set so that, for example, it varies linearly relative to the position of the zoom lens as shown in FIG. 2. Accordingly, the magnification of the zoom lens can be controlled to a predetermined value by adjusting the position of the zoom lens in response to the zoom lens controlling signal. In particular, the zoom lens is servo controlled so that the magnification thereof is decreased as the magnitude of the subject on the display screen of the display 4 increases, but as the magnitude of the subject decreases, the magnification of the zoom lens is increased accordingly. As a result, the magnitude of the subject displayed on the display unit 4 is maintained at a magnitude designated at a timing at which the designating switch 7 is manually operated.

Subsequently, the principle of detection of a movement by the movement detecting section 8 is described. A movement of a subject can be detected, for example, from an optical flow (area base). An optical flow signifies determination of x(t) and y(t) which satisfy $$dI(x, y, t)/dt = 0 \quad (1)$$

for a brightness I(x, y, t) of a point P (x(t), y(t)) of an image stored in the memories 2 and 3. The equation (1) can be modified into the following equation:

$$\frac{\partial I}{\partial x} \frac{dx}{dt} + \frac{\partial I}{\partial y} \frac{dy}{dt} + \frac{\partial I}{\partial t} = 0 \quad (2)$$

The equation (1) above can be further modified into the following equation (3):

$$I_x u + I_y v + I_t = 0 \quad (3)$$

where $I_x$, $I_y$, $I_t$, u and v have the following meanings:

$$I_x = \frac{\partial I}{\partial x}, I_y = \frac{\partial I}{\partial y}, I_t = \frac{\partial I}{\partial t}, \quad (4)$$

$$u = \frac{dx}{dt}, v = \frac{dy}{dt}$$

The equation (3) above is a regularization problem and can be solved by applying a restriction. In the case of an image, the variables u and v vary moderately. The restriction signifies that the value of the quotation (5) below is small:

$$\|\nabla(u,v)\|^2 = (u_y^2 + v_y^2 + u_x^2 + v_x^2) \quad (5)$$

Providing the equation (5) to the equation (3), the following equation (6) is obtained:

$$F(u, v, u_x, v_x, u_y, v_y, x, y) \quad (6)$$

where λ is a contant = $(I_x u + I_y v + I_t)^2 +$ $$\lambda/4 \, (u_y^2 + v_y^2 + u_x^2 + v_x^2)$$

The equation (3) is converted into a minimum value problem of the following equation (7) that the equation (6) is integrated over the entire screen and a minimum value of the integration is calculated:

$$\min_{u,v} \int\int F \cdot dx \, dy \quad (7)$$

Since the values of u and v which minimize the equation (7) satisfies the Euler's equation, the following equations (8) and (9) are obtained:

$$Fu - \frac{\partial}{\partial x} Fux - \frac{\partial}{\partial y} Fuy = 0 \quad (8)$$

$$Fv - \frac{\partial}{\partial x} Fvx - \frac{\partial}{\partial y} Fvy = 0 \quad (9)$$

The following equations (10) and (11) are obtained from the equations (8), (9) and (6):

$$(I_x u + I_y v + I_t)I_x - \frac{\lambda}{4}\left(\frac{\partial}{\partial x} u_x + \frac{\partial}{\partial y} u_y\right) = 0 \quad (10)$$

$$(I_xu + I_yv + I_t)I_y - \frac{\lambda}{4}\left(\frac{\partial}{\partial x}v_x + \frac{\partial}{\partial y}v_y\right) = 0 \quad (11)$$

Points which permit discontinuity are introduced from a variation in brightness and so forth into the equations (10) and (11) to obtain the following equations (12) and (13):

$$(I_xu + I_yv + I_t)I_x - \quad (12)$$

$$\frac{\lambda}{4}\left\{\frac{\partial}{\partial x}(1 - L^v)u_x + \frac{\partial}{\partial y}(1 - L^h)v_x\right\} = 0$$

$$(I_xu + I_yv + I_t)I_y - \quad (13)$$

$$\frac{\lambda}{4}\left\{\frac{\partial}{\partial x}(1 - L^v)v_x + \frac{\partial}{\partial y}(1 - L^h)v_y\right\} = 0$$

where $L^v$ and $L^h$ are parameters called line processes in the vertical and horizontal directions, respectively, and they indicate discontinuity when they are equal to 1. The parameters can be applied, for example, to an output upon detection of an edge. The equations (12) (13) should be solved. Modifying the equations (12) and (13) into difference forms, the following equations (14) and (15) are obtained, respectively:

$$(I_{xij}u_{ij} + I_{yij}v_{ij} + I_{tij})I_{xij} - \quad (14)$$

$$\frac{\lambda}{4}\{L_{i,j}^v(u_{i+1,j} - u_{i,j}) - L_{i-1,j}^v(u_{i,j} - u_{i-1,j}) +$$

$$L_{i,j}^h(u_{i,j+1} - u_{i,j}) - L_{i,j-1}^h(u_{i,j} - u_{i,j-1})\} = 0$$

$$(I_{xij}u_{ij} + I_{yij}v_{ij} + I_{tij})I_{yij} - \quad (15)$$

$$\frac{\lambda}{4\lambda}\{L_{i,j}^v(v_{i+1,j} - v_{i,j}) - L_{i-1,j}^v(v_{i,j} - v_{i-1,j}) +$$

$$L_{i,j}^h(v_{i,j+1} - v_{i,j}) - L_{i,j-1}^h(v_{i,j} - v_{i,j-1})\} = 0$$

Variable methods of solving the equations (14) and (15) are available, and here, a method of solving them in accordance with the simplest gradient descent method is described. Putting the left sides of the equations (14) and (15) as the following equations (16) and (17), respectively, a repeat calculation is performed:
at the $k+1$-th step in the repeat calculation can be represented, using $$\Delta F_u = \text{[left side of the equation (14)]} \quad (16)$$

$$\Delta F_v = \text{[left side of the equation (15)]} \quad (17)$$

The values $$u_{i,j}^{k+1}, v_{i,j}^{k+1}$$

$$u_{i,j}^k, v_{i,j}^k$$

at the k-th step, in the following manner:

$$u_{i,j}^{k+1} = u_{i,j}^k - \alpha\Delta F_u^k \quad (18)$$

$$v_{i,j}^{k+1} = v_{i,j}^k - \alpha\Delta F_v^k \quad (19)$$

$\Delta F_u^k$ and $\Delta F_v^k$ are $\Delta F_u$ and $\Delta F_v$ calculated using $$u_{i,j}^k, v_{i,j}^k$$

at the k-th step, respectively, and $\alpha$ is a constant within the range of $0 < \alpha < 1$.

Figure 3:
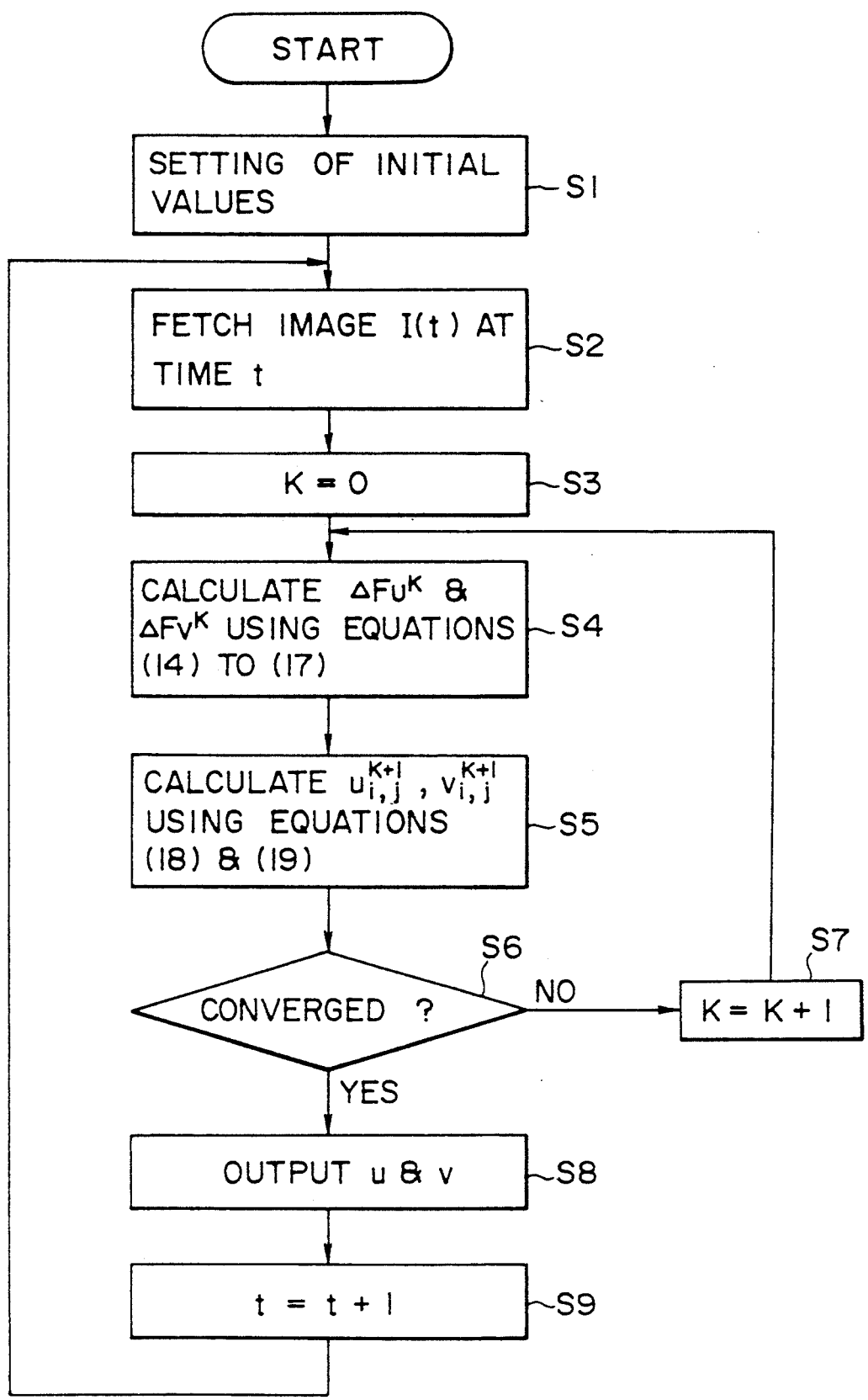
FIG. 3 is a flow chart illustrating operation of the camera controlling apparatus of FIG. 1.

Operation of the optical flow calculation described above is illustrated in FIG. 3. Referring to FIG. 3, initialization, that is, setting of initial values, is performed first at step S1, and then brightness data I(t) of an image at the point of time t are fetched from the memory 2 at step S2. Then at step S3, the variable k is set to 0. Subsequently, the control sequence advances to step S4, at which $\Delta F_u^k$ and $\Delta F_v^k$ are calculated using the equations (14) to (17).

Then, the control sequence advances to step S5, at which $$u_{i,j}^{k+1}, v_{i,j}^{k+1}$$

are calculated using the equations (18) and (19). Then at step S6, it is judged whether or not the repeat calculation has converged. The judgment may be based on whether or not the error given by the following expression $$\int\int \| u^k = v^k \| dx, dy\epsilon$$

has becomes a predetermined reference value $\epsilon$ or whether or not the variable k has become equal to 256.

If it is not judged at step S6 that the repeat calculation has converged, the control sequence advances to step S7, at which the variable k is incremented by 1. Then, the control sequence returns to step S4 to repeat such processing as described above. On the contrary, if it is judged at step S6 that the repeat calculation has converged, the control sequence advances to step S8, at which the values u and v are outputted. Then, the control sequence advances to step S9, at which the time t is incremented by 1, whereafter the control sequence returns to step S2. Consequently, the processing at the steps beginning with step S2 is repeated.

Figure 4:
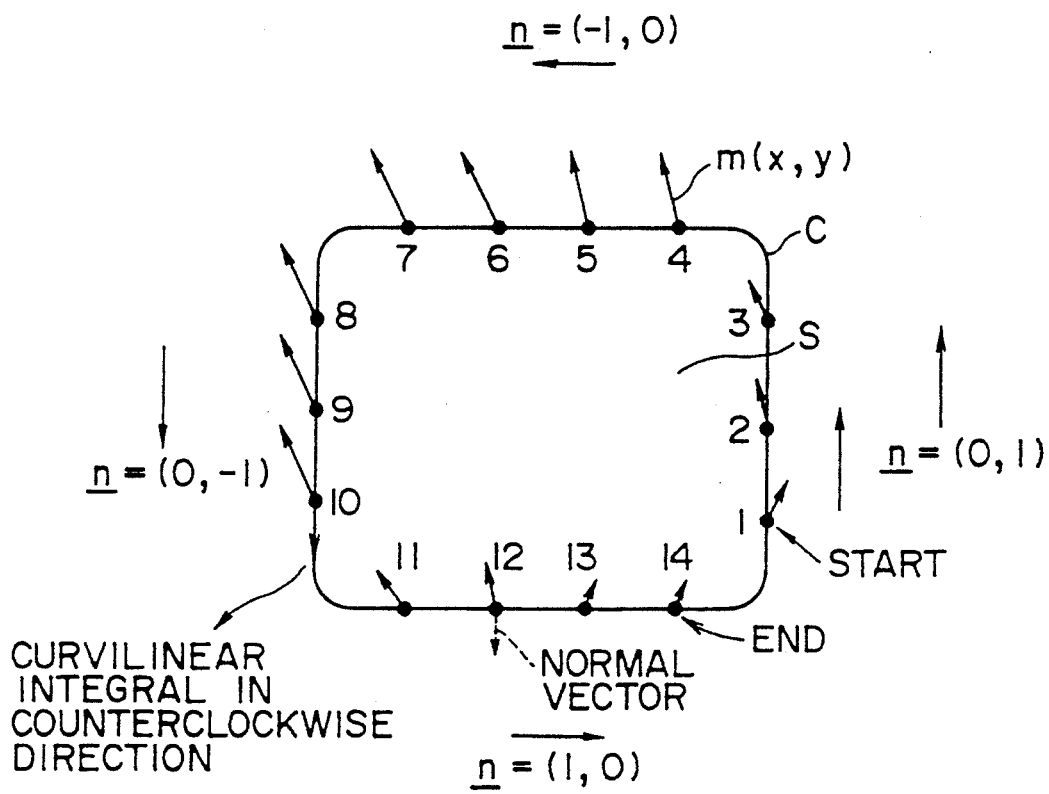
FIG. 4 is a diagram illustrating a principle of detection of a variation in size.

Subsequently, a method of detecting a variation of the magnitude at the magnitude variation detecting section 9 is described. Now, it is assumed that the edge of a region of an image of a subject which is desired to have a fixed area is represented by a closed loop C as shown in FIG. 4. The following equation should be calculated so that the divergence value of the movement vector along the closed loop C may be equal to 0:

$$M(t) = \oint_C n(x,y)\cdot m(x,y)dl \quad (20)$$

The vector of each dark spot on the closed loop C represents a movement vector $$m(x, y)$$

detected by the movement detecting section 8. The normal vector of the closed loop C $$n(x, y)$$

is taken on the outside of the closed loop C, that is, on the right-hand side in the advancing direction for the curvilinear integral in the counterclockwise direction. Generally, $$n(x, y) \cdot m(x, y) = n_x m_x + n_y m_y$$

is calculated, where $$n(x, y) = (n_x, n_y), m(x, y) = (m_x, m_y)$$

In the present example, however, $$n(x, y) = (1, 0) \text{ or } (0, 1) \text{ or } (-1, 0) \text{ or } (0, -1)$$

and accordingly, $$n(x, y) \cdot m(x, y) = m_x \text{ or } m_y \text{ or } -m_x \text{ or } -m_y$$

and accordingly, the integral is addition. Consequently, the following equation stands:

$$M(t) = \oint_C n(x,y) \cdot m(x,y) dl \qquad (21)$$
$$= m_{x1} + m_{x2} + m_{x3} + m_{y4} + m_{y5} + m_{y6} + m_{y7} -$$
$$m_{x8} - m_{x9} - m_{x10} - m_{y11} - m_{y12} - m_{y13} - m_{y14}$$

where the vectors at points corresponding to the numbers $k = 1$ to 14 in FIG. 4 are represented by $$mi$$

where $$mi = (mxk, myk)$$

Figure 5:
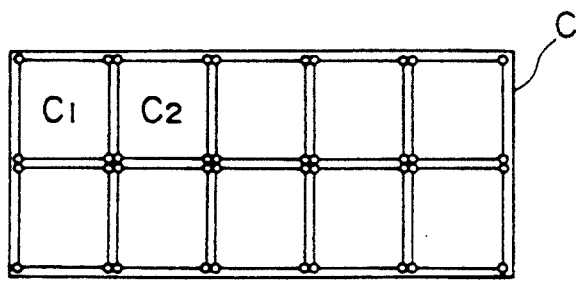
FIG. 5 is a diagram illustrating another principle of detection of a variation in size.

By the way, when such a large closed loop C as shown in FIG. 5 is assumed, calculation of $$M(t) = \oint_C n \cdot m dl$$

is equivalent to addition for small closed loops $C_1, C_2, \ldots$. This can be represented by the following equation:

$$M(t) = \oint_C n \cdot m dl = \sum_i \oint_C n \cdot m dl_i$$

Figure 6:
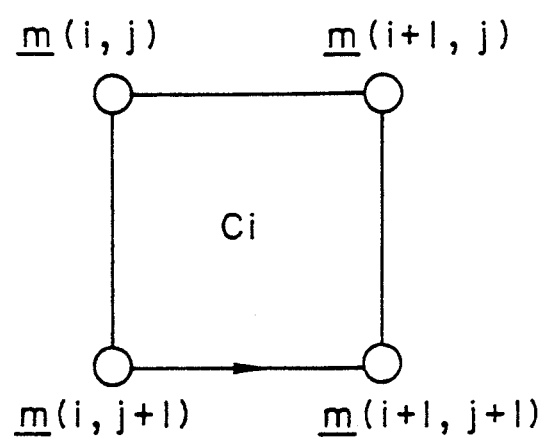
FIG. 6 is an enlarged representation of the illustration of FIG. 5.

In the case of the divergence form as shown in FIG. 6, the integral should be defined in the following manner:

$$M_i(t) = \oint_{ci} n \cdot m dl_i$$
$$= -m_x(i,j) + m_x(i,j+1) - m_x(i+1,j+1) +$$
$$m_x(i+1,j) + m_y(i,j) + m_y(i,j+1) +$$
$$m_y(i+1,j+1) + m_y(i+1,j)$$

The present selection cancels common points when values of adjacent closed loops are added. Consequently, $$M(t) = \sum_i M_i(t)$$

should be calculated.

The methods described above are effective when a processing apparatus of the parallel processing type is assumed.

Or else, based on the Gauss's theorem, a variation of the magnitude can be detected from the following equation:

$$M(t) = \int_S v m ds \qquad (22)$$

Now, the following equation stands:

$$v \cdot m = \frac{\partial}{\partial x} m_x + \frac{\partial}{\partial y} m_y$$

If the equation is modified into a difference form, then $$\nabla \cdot m(i,j) = m_x(i-1,j) - m_x(i,j) +$$
$$m_y(i,j-1) - m_y(i,j)$$

where $$m(i,j) = (m_x(i,j), m_y(i,j))$$

is a vector at the coordinates (i,j) an $$\frac{\partial m_x(i,j)}{\partial x} = m(i-1,j) - m(i,j)$$

is used as a difference model of differentiation. If the integration is modified into addition, then $$M(t) = \sum_j \sum_i v \cdot m(i,j) = \sum_j \sum_i [m_x(i-1,j) - m_x(i,j)] + \qquad (23)$$
$$\sum_i \sum_j [m_y(i-1,j) - m_y(i,j)]$$

However, since $$\nabla \cdot m(1,1) + \nabla \cdot m(2,1) = m_x(0,1) - m_x(1,1) + m_x(1,1) -$$
$$m_x(2,1) = m_x(0,1) - m_x(2,1)$$

the equation (23) is finally identical with the equation (21) above.

Having now fully described the invention, it will be apparent to one of ordinary skill in the art that many changes and modifications can be made thereto without departing from the spirit and scope of the invention as set forth herein.

What is claimed is:

1. A camera having zoom control, comprising:
   imaging means for photographing a subject and generating an image signal;
   movement detecting means for detecting a movement of the subject photographed by said imaging means and providing a movement output signal;
   magnitude variation detecting means for detecting a variation in the magnitude of the subject photographed by said imaging means in response to the movement output signal and generating an output;
   optical means having zoom structure for magnifying the image; and
   controlling means which controls the zoom structure of the optical means in response to the output of said magnitude variation detecting means so that the magnitude of the subject remains substantially constant.

2. A camera according to claim 1, further comprising storage means for storing an image signal for a frame outputted from said imaging means, said movement detecting means receiving an image signal of the current frame outputted from said imaging means and another image signal of the previous frame recalled from said storage means to detect a movement of the subject being photographed by said imaging means.

3. A camera according to claim 1, further comprising first storage means for storing an image signal for a frame outputted from said imaging means, and second storage means for receiving and storing therein a previous image signal recalled from said first storage means, said movement detecting means receiving the image signal of a frame recalled from said first storage means and receiving another image signal from said second storage means, which corresponds to a previous frame recalled from said first storage means, to detect a movement of the subject photographed by said imaging means.

4. A camera according to claim 1, wherein,
said optical means comprises a zoom lens the magnification of which is controlled by varying the position of the zoom lens along an optical axis; and
said controlling means comprises a servo-control means which moves the zoom lens to maintain the magnitude of the subject at a predetermined value by varying the magnification of the zoom lens inversely with respect to the magnitude of the designated subject.

5. A camera according to claim 1, wherein the controlling means sets the magnitude of the subject in a frame area to be a substantially constant value equal to the magnitude value of the subject at the time a target designating switch is activated.

6. The camera according to claim 1, wherein,
said movement detecting means outputs a movement vector output signal;
said magnitude variation detecting means receives a signal indicating the position of the subject within a frame area and receives the movement vector output signal, and then detects a variation of magnitude of the subject in response to the subject position signal and the movement vector output signal.

7. A camera according to claim 1, further comprising target designating means for designating a subject within the field of view of the camera whose magnitude is to be controlled by said controlling means when the subject is photographed by said imaging means, and for outputting a position signal indicating the position of the subject to the magnitude variation detecting means.

8. A camera according to claim 7, wherein the target designating means comprises a cursor controlling lever which moves a cursor across a display means for displaying the image signals output by the imaging means, and a designating switch; whereby said target designating means outputs a position of the cursor as the position signal to the magnitude variation detecting means in response to a signal from the designating switch.

9. The camera according to claim 7, wherein,
said optical means comprises a zoom lens the magnification of which is controlled by varying the position of the zoom lens along an optical axis; and
said controlling means comprises a servo-control means which moves the zoom lens to maintain the magnitude of the subject at a predetermined value by varying the magnification of the zoom lens inversely with respect to the magnitude of the designated subject.

10. The camera according to claim 9, wherein the controlling means sets the magnitude of the subject in a frame area to be a substantially constant value equal to the magnitude value of the subject at the time the target designating switch is activated.

* * * * *